United States Patent
Maknickas et al.

(10) Patent No.: US 11,582,187 B1
(45) Date of Patent: Feb. 14, 2023

(54) METHOD AND APPARATUS FOR PROVIDING IP ADDRESS FILTERING

(71) Applicant: UAB 360 IT, Vilnius (LT)

(72) Inventors: Vykintas Maknickas, Vilnius (LT); Mohamed Adly Amer Elgaafary, Vilnius (LT); Aleksandr Ševčenko, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

(21) Appl. No.: 17/675,006

(22) Filed: Feb. 18, 2022

(51) Int. Cl.
*H04L 9/40* (2022.01)

(52) U.S. Cl.
CPC ...... *H04L 63/0236* (2013.01); *H04L 63/0245* (2013.01); *H04L 63/14* (2013.01); *H04L 63/1441* (2013.01); *H04L 63/1483* (2013.01)

(58) Field of Classification Search
CPC . H04L 63/0236; H04L 63/0245; H04L 63/14; H04L 63/1441; H04L 63/1483
See application file for complete search history.

(56) References Cited

U.S. PATENT DOCUMENTS

| | | | | |
|---|---|---|---|---|
| 7,849,507 | B1* | 12/2010 | Bloch | H04L 63/168 726/22 |
| 7,854,001 | B1* | 12/2010 | Chen | H04L 41/00 726/22 |
| 2016/0014081 | A1* | 1/2016 | Don, Jr. | H04L 63/0236 726/11 |
| 2019/0158520 | A1* | 5/2019 | DiValentin | H04L 63/145 |
| 2021/0120034 | A1* | 4/2021 | Starov | H04L 67/02 |
| 2021/0297428 | A1* | 9/2021 | Hatekar | G06F 21/562 |

* cited by examiner

*Primary Examiner* — Huan V Doan
(74) *Attorney, Agent, or Firm* — Moser Taboada

(57) ABSTRACT

A method and apparatus for providing IP address filtering. The method identifies one or more suspicious Uniform Resource Locators (URLs) and resolves the one or more suspicious URLs to one or more suspicious IP addresses. A suspicious IP address list is created containing the one or more suspicious IP addresses. The suspicious IP address list may be used to facilitate a security response to filter one or more of the IP addresses in the suspicious IP address list.

18 Claims, 3 Drawing Sheets

METHOD AND APPARATUS FOR PROVIDING IP ADDRESS FILTERING

FIELD

The present invention relates generally to Internet security protocols, and more particularly to a method and apparatus for providing IP address filtering.

BACKGROUND

Computer devices (e.g., smart phones, laptop computers, desktop computers, gaming devices, etc.) that access the Internet identify information sources (e.g., servers) using Uniform Resource Locators (URLs). The URL contains an identifier of the server, the location of the information, and the protocol (e.g., HTTP, HTTPS, etc.) to be used to access the information. Using a URL, a browser may access content stored on the server using the proper transfer protocol and information location. Information available at servers at some URLs may be undesired, i.e., pornography, advertisements, viruses, malware, phishing attacks, misinformation sources, and the like. Users may selectively block access to such URLs by adding the URL to a rule set, e.g., a block list. However, to add a URL to the block list, the computer device may have already accessed the malicious content and harmed the computer device. As such, block listing URLs is a manual, time consuming process and may result in harm to a computer device before the malicious content is identified.

Therefore, there is a need for improved methods and apparatuses for providing computer security and identifying servers with malicious or otherwise undesirable content before such a server is accessed by the computer device.

SUMMARY

A method and apparatus for providing IP address filtering. The method identifies one or more suspicious Uniform Resource Locators (URLs) and resolves the one or more suspicious URLs to one or more suspicious IP addresses. A suspicious IP address list is created containing the one or more suspicious IP addresses. The suspicious IP address list may be used to facilitate a security response to filter one or more of the IP addresses in the suspicious IP address list.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

Figure 1:
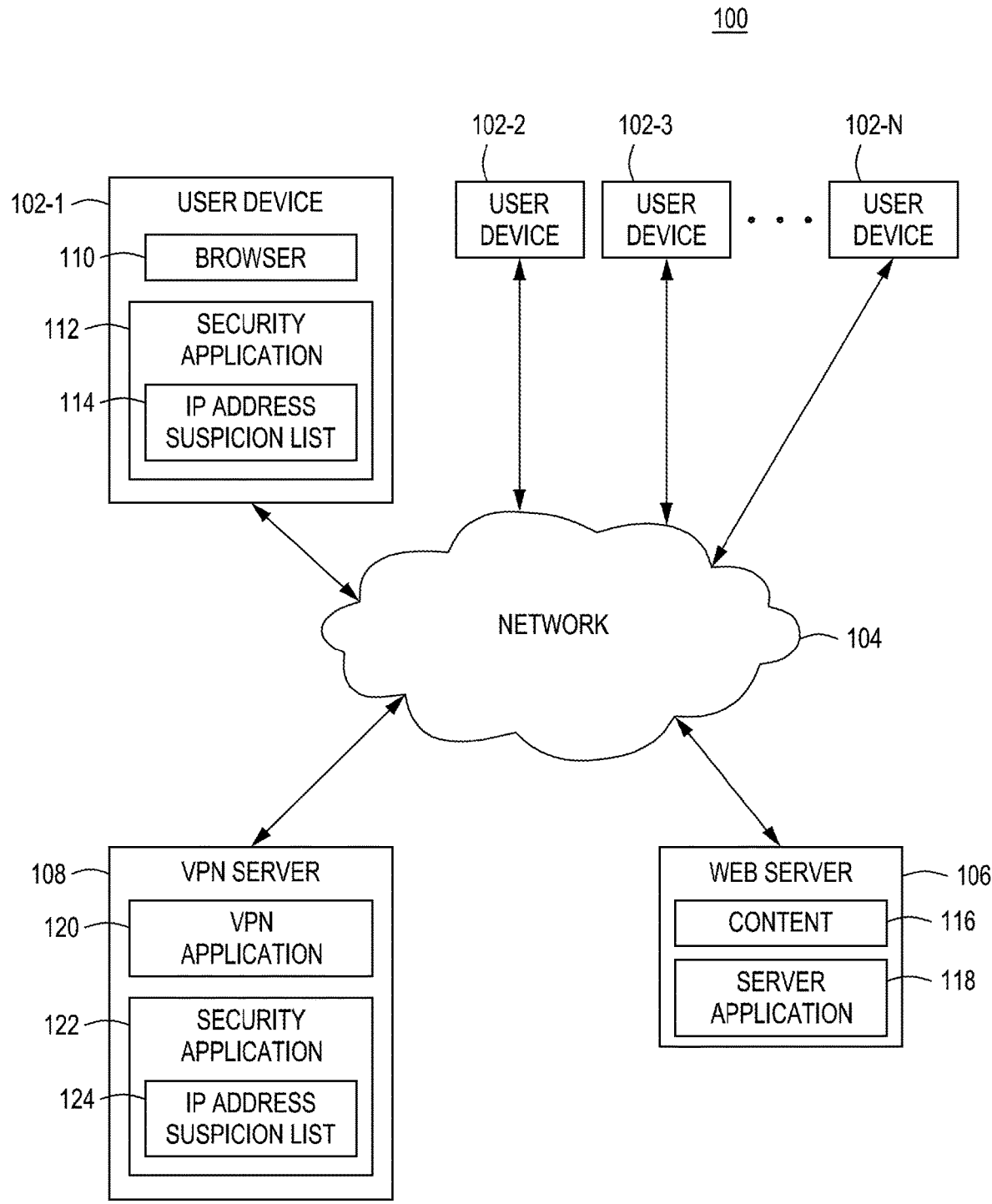
FIG. 1 illustrates an example of a computer system for providing IP address filtering in accordance with at least one embodiment of the invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

The following detailed description describes techniques (e.g., methods, processes, apparatuses and systems) for performing IP address filtering to provide computer security. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims.

Embodiments consistent with the present invention use IP address filtering to provide computer security for at least one user device (e.g., a computing device). In some embodiments, upon installation of a client security application (e.g., an anti-malware application), an IP address suspicion list is updated or installed and the IP address suspicion list is used when the security application is executed. The IP address suspicion list is used to filter content from any server identified by an IP address on the suspicion list. Filtering may involve providing a user with a warning that can be overridden or, in some situations, content from an IP address may be completely blocked.

The IP addresses for the suspicion list are derived from URLs associated with the IP addresses. Embodiments of the invention utilize web crawlers to identify URLs associated with suspicious or undesirable content, e.g., sources of malware, viruses, phishing attacks, misinformation, undesirable content, and the like. Many times a particular server will be associated with a plurality of URLs; thus, thwarting a conventional URL blocking technique. Embodiments of the invention resolve the suspicious URLs to specific IP addresses. In addition, the crawler may collect additional context information such as geographic location of the server, history of the server's activity, identify what services the server uses, identify how many servers or websites using the IP address are offering suspicious content, and so on. The crawlers collect any information that can be used to determine if the server at a particular IP address is involved in suspicious activity. Using the collected information, embodiments of the invention may rank or score IP addresses based on the level and type of suspicious activity a server may support. The rank or score may be used to define the level of response from the security application.

Thus, methods and apparatuses consistent with embodiments of this present invention use IP address filtering to provide computer security. Details of such methods and apparatuses are described in detail below with respect to the figures.

FIG. 1 illustrates an example of a computer network system 100 within which user devices (i.e., computing devices) use IP filtering to provide computer security. In FIG. 1, the system 100 comprises at least one user device 102, a web server 106 and a computer network 104, (e.g., the Internet) connecting the web server 106 to the user devices 102. The server 106 is a centralized computing device used to execute application(s) (server application 118) and communicate content 116 to/from user devices 102. In an alternative embodiment, the system 100 further comprises a virtual private network (VPN) server 108 (or other server capable of providing cybersecurity services to user devices) that supports the security application 122 as described below. The general structure of such servers and/or user devices is described in detail below with respect to FIG. 3.

User devices 102-1, 102-2, 102-3 . . . 102-N (collectively referred to as user devices 102) communicate through network 104 with the web server 106. In some embodiments, user device 102 may be any computing device capable of executing browser 110 and a security application 112. User device 102 may comprise any computing device that is connected to a network, including, for example, a laptop, a mobile phone, a tablet computer, a desktop computer, a smart device, a router and other network devices. Each user device 102 comprises a browser 110 and a security application 112. In one embodiment, the security application 112 may perform its functions locally, or the application may perform one or more functions remotely on the VPN server 108. For example, the security application 112 may generate or update the IP address suspicion list 114 locally or it may rely on the VPN server to remotely provide the IP address filtering function on traffic that passes through the VPN server to the user device. The browser 110 is a well-known application for accessing and displaying web page content. Such browsers include, but are not limited to, Safari®, Chrome®, Explorer®, Firefox®, etc.

In one embodiment, the security application 112 comprises the IP address suspicion list 114. Locally, within the user device 102, the security application 112 utilizes the IP suspicion list 114 to filter content received from a web server 106 associated with particular IP addresses in the list 114. The response to content arriving from a suspicious IP address may range from merely logging the activity, to warning a user of the possibility the content may be malicious, to outright blocking the ability of the user device to access the content.

Alternatively, the security application may reside elsewhere in the system 100 to provide the filtering service. In one embodiment, the security application 122 and its IP address suspicion list 124 resides in the VPN server 108. As such, when VPN application 120 is used to handle traffic to/from the user device 102, the security application 122 filters the content based on the IP address suspicion list 124. In other embodiments, the security application function may be applied in a firewall, router, or any other device within a computer system 100 that suspicious content may be blocked or otherwise handled.

Figure 2:
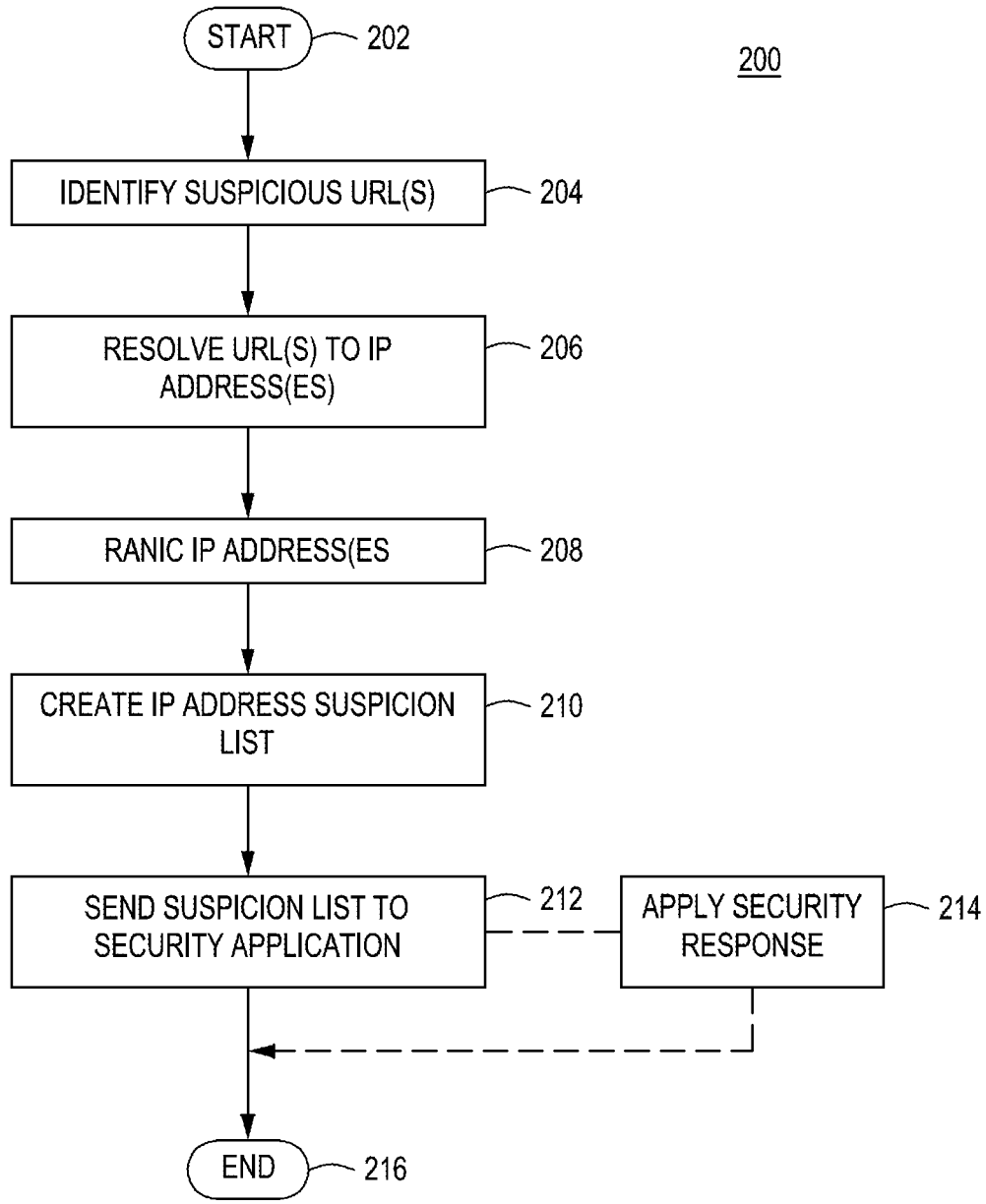
FIG. 2 depicts a flow diagram of a method of creating and using a suspicious IP address list for filtering IP addresses in accordance with at least one embodiment of the invention.

FIG. 2 illustrates an exemplary flow diagram representing one or more of the processes as described herein. Each block of the diagram may represent a module of code to execute and/or combinations of hardware and/or software configured to perform one or more processes described herein. Though illustrated in a particular order, the following figures are not meant to be so limiting. Any number of blocks may proceed in any order (including being omitted) and/or substantially simultaneously (i.e., within technical tolerances of processors, etc.) to perform the operations described herein.

FIG. 2 is a flow diagram of a method 200 performed by the security application 112 or 122 for creating a suspicious IP address list in accordance with at least one embodiment of the invention. The method 200 may be implemented as a component of the security application 112 or 122 of FIG. 1 or may be executed on a separate server used for generating the suspicious IP address list. The method begins at 202 and proceeds to 204, where the method identifies one or more suspicious URL(s). In one embodiment, suspicious URL(s) are identified using a web crawler. Suspicious URLs may also be manually added to a suspicious URL database by users. In addition, security applications that identify suspicious URLs may also report the URL to the database. A URL may be flagged as suspicious if the content associated with the URL is malicious (e.g., contains malware or viruses), contains inappropriate content (e.g., pornography, misinformation, unwanted advertising, etc.), contains phishing or other scam content, and the like.

At 206, the method 200 resolves the URL(s) to their associated IP address(es). In one embodiment, a URL to IP address database is accessed to determine the IP address(es) that are associated with a given URL. URL to IP address databases and on-line lookups are available from third-party providers. The database may provide additional information (e.g., geographical locations of servers) that may be helpful in understanding the suspicious nature of the URL/IP address.

At 208, in some embodiments, the method 200 may rank the suspicious IP addresses (i.e., generate a threat ranking measuring the threat risk associated with the IP address). The ranking is performed based on various forms of context. For example, IP addresses that are associated with countries that distribute malware, viruses, scams, etc. can be ranked at a higher threat level than IP addresses associated with countries that do not generally distribute malicious content. Another example of context is identifying multiple suspicious URLs that are associated with the same IP address—an indication that many URLs are being used to distribute malicious content. In addition, some IP addresses may be re-used with various URLs and be flagged as having suspicious behavior. However, cloud service providers re-use IP addresses for legitimate reasons. Consequently, in some embodiments, IP addresses associated with known cloud services providers may be "white listed" and identified as IP addresses to not place on the suspicious IP address list.

Since the suspicion level of an IP address may change due to reuse of the address with a different URL or the suspicious content may be removed, the ranking information may also include a time period at which the suspicious URL/IP address is retested to adjust the ranking and/or removal from the suspicious IP address list.

At 210, the method 200 creates the suspicious IP address list. In one embodiment, the ranking may not be used and the list may contain only IP addresses that are to be blocked. In other embodiments, the list may be used by the security application in a nuanced manner in which the threat rank defines the security response, i.e., lower threat results in a warning to a user that the content may be malicious or higher threat results in the IP address being blocked. In some embodiments, a particular threat level may result in IP addresses above that level being blocked.

At 212, the method 200 sends the suspicious IP address list to one or more security applications or otherwise makes the list available for use by one or more security applications. At 214, the suspicious IP address list is used to facilitate a security response (e.g., notifying the user device) by either the security application that created the list or another security application that received the list. Periodically, method 200 is executed to update the suspicious IP address list and/or update IP address threat ranking. The method 200 ends at 216.

In one embodiment, the suspicious IP address list may be created within a security service provider server (such as VPN server 108 9 in FIG. 1) and sent to one or more user devices 102 to be used by the security application 112. In other embodiments, the server 108 may create and use the suspicious IP address list to provide security to one or more user devices 102. In other embodiments, the user device may create and use the suspicious IP address list to provide security to itself. In some embodiments, user devices 102 may share the suspicious IP addresses to update and improve security across a plurality of user devices.

Figure 3:
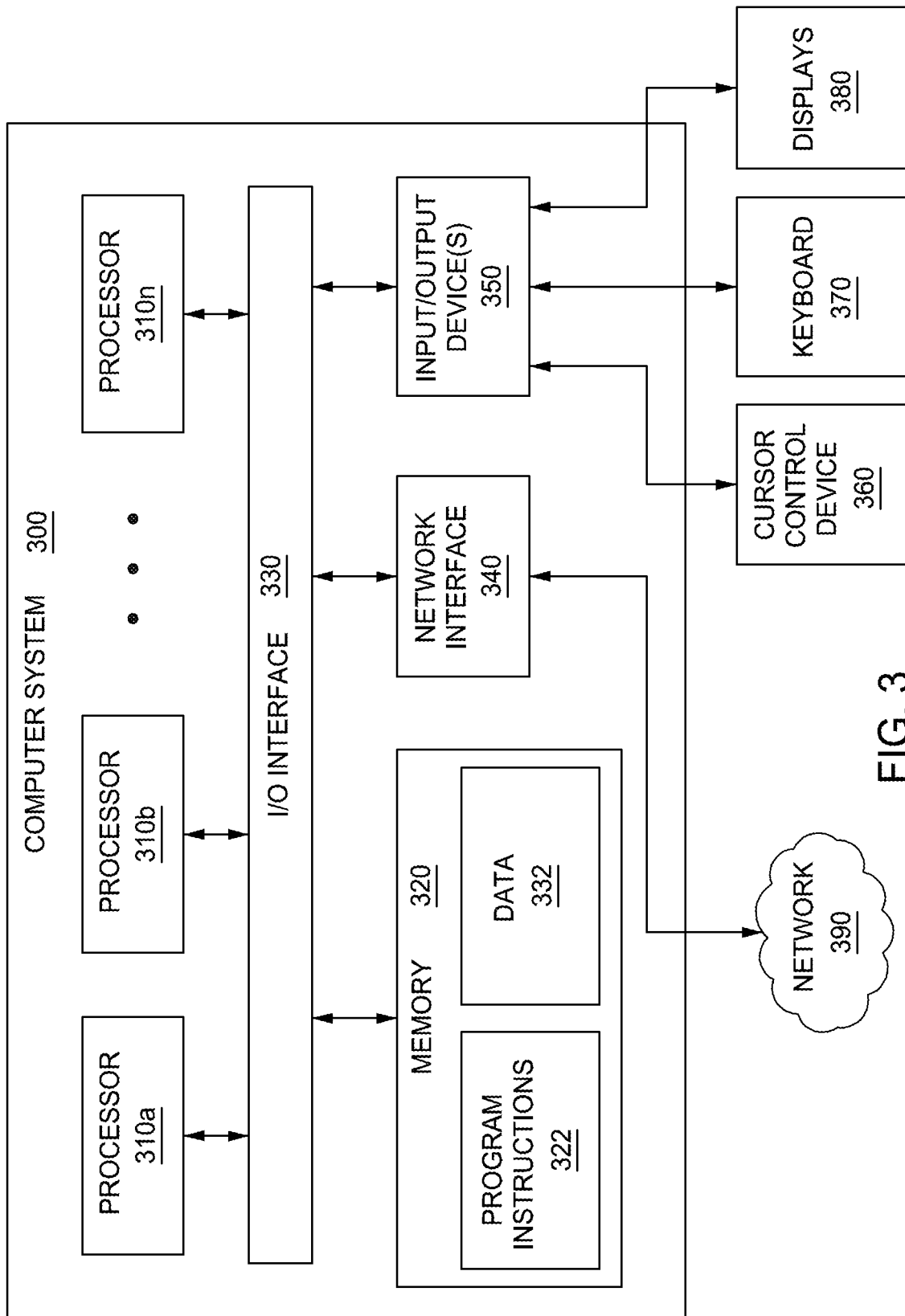
FIG. 3 depicts a high-level block diagram of a computing device suitable for use with embodiments of a system for IP address filtering in accordance with at least one embodiment of the invention.

FIG. 3 depicts a computer system 300 that can be utilized in various embodiments of the present invention to implement the computer and/or the display, according to one or more embodiments.

Various embodiments of method and system for using an IP address list to provide computer security, as described herein, may be executed on one or more computer systems, which may interact with various other devices. One such computer system is computer system 300 illustrated by FIG. 3, which may in various embodiments implement any of the elements or functionality illustrated in FIGS. 1 and 2. In various embodiments, computer system 300 may be configured to implement methods and functions described above. The computer system 300 may be used to implement any other system, device, element, functionality or method of the above-described embodiments. In the illustrated embodiments, computer system 300 may be configured to implement the user devices 102 and servers 106 and/or 108 and implement the driver functions as processor-executable executable program instructions 322 (e.g., program instructions executable by processor(s) 310) in various embodiments.

In the illustrated embodiment, computer system 300 includes one or more processors 310a-310n coupled to a system memory 320 via an input/output (I/O) interface 330. Computer system 300 further includes a network interface 340 coupled to I/O interface 330, and one or more input/output devices 350, such as cursor control device 360, keyboard 370, and display(s) 380. In various embodiments, any of the components may be utilized by the system to receive user input described above. In various embodiments, a user interface may be generated and displayed on display 380. In some cases, it is contemplated that embodiments may be implemented using a single instance of computer system 300, while in other embodiments multiple such systems, or multiple nodes making up computer system 300, may be configured to host different portions or instances of various embodiments. For example, in one embodiment some elements may be implemented via one or more nodes of computer system 300 that are distinct from those nodes implementing other elements. In another example, multiple nodes may implement computer system 300 in a distributed manner.

In different embodiments, computer system 300 may be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, firewall, or in general any type of computing or electronic device.

In various embodiments, computer system 300 may be a uniprocessor system including one processor 310, or a multiprocessor system including several processors 310 (e.g., two, four, eight, or another suitable number). Processors 310 may be any suitable processor capable of executing instructions. For example, in various embodiments processors 310 may be general-purpose or embedded processors implementing any of a variety of instruction set architectures (ISAs). In multiprocessor systems, each of processors 310 may commonly, but not necessarily, implement the same ISA.

System memory 320 may be configured to store program instructions 322 and/or data 332 accessible by processor 310. In various embodiments, system memory 320 may be implemented using any non-transitory computer readable media including any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 320. In other embodiments, program instructions and/or data may be received, sent, or stored upon different types of computer-accessible media or on similar media separate from system memory 320 or computer system 300.

In one embodiment, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any necessary protocol, timing, or other data transformations to convert data signals from one component (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. Also, in some embodiments, some or all of the functionality of I/O interface 330, such as an interface to system memory 320, may be incorporated directly into processor 310.

Network interface 340 may be configured to allow data to be exchanged between computer system 300 and other devices attached to a network (e.g., network 390), such as one or more external systems or between nodes of computer system 300. In various embodiments, network 390 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 340 may support communication via wired or wireless general data networks, such as any suitable type of Ethernet network, for example; via digital fiber communications networks; via storage area networks such as Fiber Channel SANs, or via any other suitable type of network and/or protocol.

Input/output devices 350 may, in some embodiments, include one or more display terminals, keyboards, keypads, touchpads, scanning devices, voice or optical recognition devices, or any other devices suitable for entering or accessing data by one or more computer systems 300. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

In some embodiments, the illustrated computer system may implement any of the operations and methods described above, such as the functions illustrated by the diagram of FIG. 2. The functional blocks of FIG. 2 may be implemented in the user device or may be implemented partially in the user device and partially in the server 108. In other embodiments, different elements and data may be included.

Those skilled in the art will appreciate that computer system 300 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments, some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 300 may be transmitted to computer system 300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion and are not intended to imply that any specific implementation details are required. For example, any of the described modules and/or data structures may be combined or divided into sub-modules, sub-processes, or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

Example Clauses

A. A method for providing IP address filtering comprising:
 identifying one or more suspicious Uniform Resource Locators (URLs);
 resolving the one or more suspicious URLs to one or more suspicious IP addresses; and
 creating a suspicious IP address list containing the one or more suspicious IP addresses.

B. The method of clause B, further comprising ranking the one or more suspicious IP addresses based upon a security threat level associated with each suspicious IP addresses contained in the suspicious IP address list.

C. The method of clauses A or B, wherein a suspicious URL is a URL that is associated with suspicious content.

D. The method of clauses A-C, wherein the suspicious content comprises at least one of malicious content, inappropriate content, or phishing or scam content.

E. The method of clauses A-D, wherein identifying further comprises using a web crawler to identify the one or more suspicious URLs.

F. The method of clauses A-E, further comprising using the suspicious IP address list to generate a security response for each suspicious IP address contained in the suspicious IP address list.

G. The method of clauses A-F, wherein the security response blocks access to content at one or more suspicious IP addresses.

H. Apparatus for providing IP address filtering to a computing device comprising at least one processor coupled to at least one non-transitory computer readable medium having instructions stored thereon, which, when executed by the at least one processor, cause the at least one processor to perform operations comprising:
 identifying one or more suspicious Uniform Resource Locators (URLs);
 resolving the one or more suspicious URLs to one or more suspicious IP addresses; and
 creating a suspicious IP address list containing the one or more suspicious IP addresses.

I. The apparatus of clause H, further comprising ranking the one or more suspicious IP addresses based upon a security threat level associated with each suspicious IP addresses contained in the suspicious IP address list.

J. The apparatus of clauses H or I, wherein a suspicious URL is a URL that is associated with suspicious content.

K. The apparatus of clauses H-J, wherein the suspicious content comprises at least one of malicious content, inappropriate content, or phishing or scam content.

L. The apparatus of clauses H-K, wherein identifying further comprises using a web crawler to identify the one or more suspicious URLs.

M. The apparatus of clauses H-L, further comprising using the suspicious IP address list to generate a security response for each suspicious IP address contained in the suspicious IP address list.

N. The apparatus of clauses H-M, wherein the security response blocks access to content at one or more suspicious IP addresses.

O. A system for providing IP address filtering comprising:
 a first computing device for identifying suspicious Uniform Resource Locators (URLs), resolving the one or more suspicious URLs to one or more suspicious IP addresses, and creating a suspicious IP address list containing the one or more suspicious IP addresses; and
 a second computing device for receiving the suspicious IP address list and for using the suspicious IP address list to generate a security response for each suspicious IP address contained in the suspicious IP address list.

P. The system of clause O, wherein the first computing device and the second computing device are the same computing device.

Q. The system of clauses O or P, wherein the first computing device ranks the one or more suspicious IP addresses based upon a security threat level associated with each suspicious IP addresses contained in the suspicious IP address list.

R. The system of clauses O-Q, wherein a suspicious URL is a URL that is associated with suspicious content.

S. The system of clauses O-R, wherein the suspicious content comprises at least one of malicious content, inappropriate content, or phishing or scam content.

T. The system of clauses O-S, wherein the security response blocks access to content at one or more suspicious IP addresses.

What is claimed is:

1. A method for providing Internet Protocol (IP) address filtering comprising:
 identifying one or more suspicious Uniform Resource Locators (URLs) using a web crawler;
 resolving the one or more suspicious URLs to one or more suspicious IP addresses;
 determining relative security threat levels between the one or more suspicious IP addresses by ranking the one or more suspicious IP addresses into multiple levels based upon a security threat level associated with each of the one or more suspicious IP addresses, wherein the one or more suspicious IP addresses is associated with a time period at which the respective suspicious IP address is re-ranked; and
 creating a suspicious IP address list containing the one or more suspicious IP addresses.

2. The method of claim 1, further comprising the ranking of the one or more suspicious IP addresses in the suspicious IP address list and a security response for each suspicious IP address contained in the suspicious IP address list is based on a respective ranking.

3. The method of claim 1, wherein a suspicious URL is a URL that is associated with suspicious content.

4. The method of claim 3, wherein the suspicious content comprises at least one of malicious content, inappropriate content, or phishing or scam content.

5. The method of claim 1, further comprising using the suspicious IP address list to generate a security response for each suspicious IP address contained in the suspicious IP address list.

6. The method of claim 5, wherein the security response blocks access to content at one or more suspicious IP addresses.

7. A non-transitory machine-readable medium having stored thereon at least one program, the at least one program including instructions which, when executed by a processor, cause the processor to perform a method in a
 processor-based system for providing Internet Protocol (IP) address filtering to a computing device comprising:

identifying one or more suspicious Uniform Resource Locators (URLs) using a web crawler;

resolving the one or more suspicious URLs to one or more suspicious IP addresses;

determining relative security threat levels between the one or more suspicious IP addresses by ranking the one or more suspicious IP addresses into multiple levels based upon a security threat level associated with each of the one or more suspicious IP addresses, wherein the one or more suspicious IP addresses is associated with a time period at which the respective suspicious IP address is re-ranked; and creating a suspicious IP address list containing the one or more suspicious IP addresses.

8. The non-transitory machine-readable medium of claim 7, wherein the method further comprises the ranking of the one or more suspicious IP addresses in the suspicious IP address list and a security response for each suspicious IP address contained in the suspicious IP address list is based on a respective ranking.

9. The non-transitory machine-readable medium of claim 7, wherein a suspicious URL is a URL that is associated with suspicious content.

10. The non-transitory machine-readable medium of claim 9, wherein the suspicious content comprises at least one of malicious content, inappropriate content, or phishing or scam content.

11. The non-transitory machine-readable medium of claim 7, wherein the method further comprises using the suspicious IP address list to generate a security response for each suspicious IP address contained in the suspicious IP address list.

12. The non-transitory machine-readable medium of claim 11, wherein the security response blocks access to content at one or more suspicious IP addresses.

13. A system for providing IP address filtering comprising:

a first computing device for identifying suspicious Uniform Resource Locators (URLs) using a web crawler, resolving the one or more suspicious URLs to one or more suspicious Internet Protocol (IP) addresses, determining relative security threat levels between the one or more suspicious IP addresses by ranking the one or more suspicious IP addresses into multiple levels based upon a security threat level associated with each of the one or more suspicious IP addresses, wherein the one or more suspicious IP addresses is associated with a time period at which the respective suspicious IP address is re-ranked, and creating a suspicious IP address list containing the one or more suspicious IP addresses; and a second computing device for receiving the suspicious IP address list and for using the suspicious IP address list to generate a security response for each suspicious IP address contained in the suspicious IP address list.

14. The system of claim 13, wherein the first computing device and the second computing device are the same computing device.

15. The system of claim 13, wherein the first computing device includes the ranks of the one or more suspicious IP addresses in the suspicious IP address list and a security response for each suspicious IP address contained in the suspicious IP address list is based on a respective ranking.

16. The system of claim 13, wherein a suspicious URL is a URL that is associated with suspicious content.

17. The system of claim 16, wherein the suspicious content comprises at least one of malicious content, inappropriate content, or phishing or scam content.

18. The system of claim 13, wherein the security response blocks access to content at one or more suspicious IP addresses.

* * * * *